J. B. SCHECK.
WOOD SAWING MACHINE.
APPLICATION FILED JULY 5, 1910.

987,747.

Patented Mar. 28, 1911.

3 SHEETS—SHEET 2.

ATTEST
E. M. Fisher
J. C. Mussun

INVENTOR
JOHN BERNARD SCHECK
BY Fisher & Moore ATTYS.

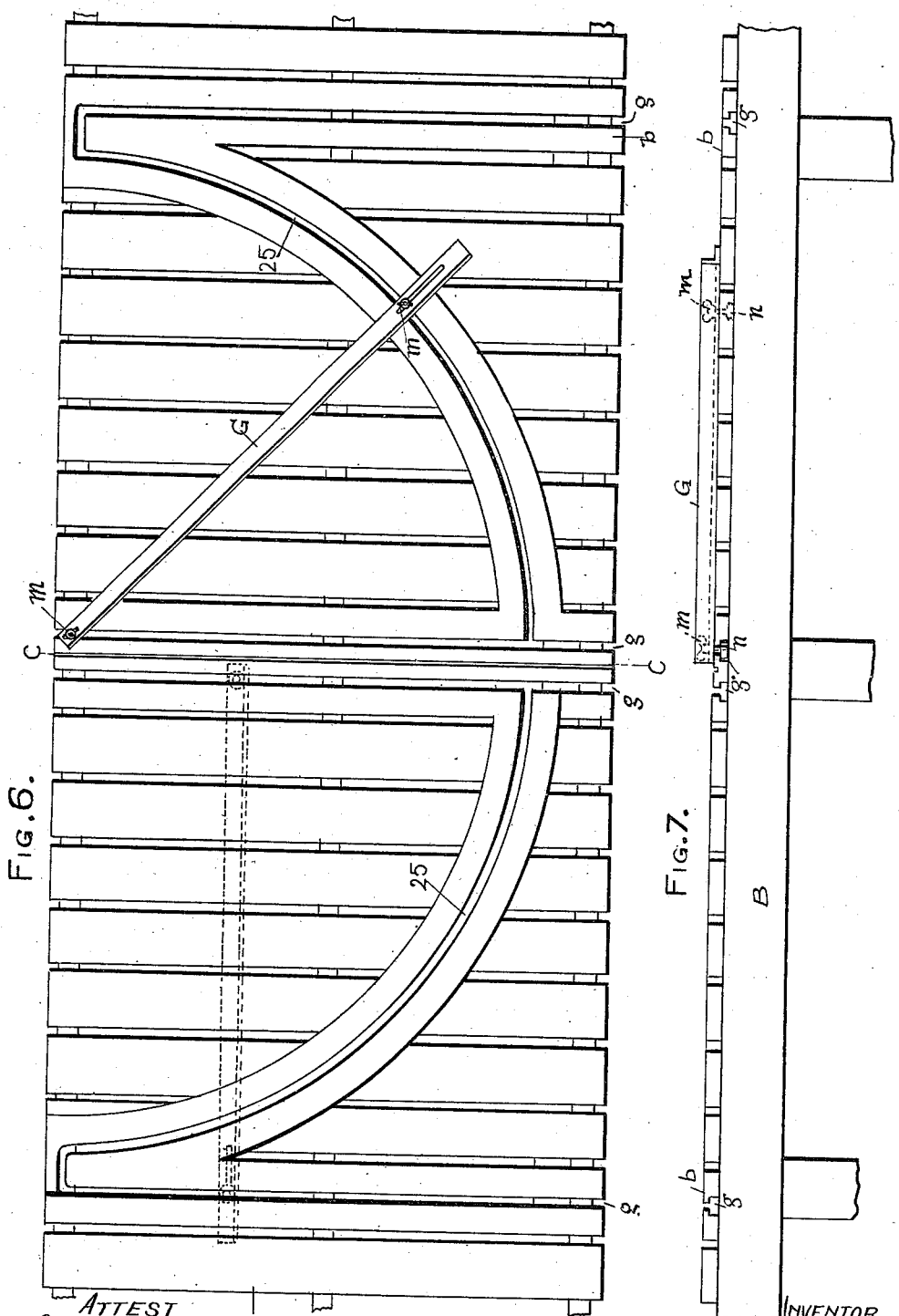

UNITED STATES PATENT OFFICE.

JOHN BERNARD SCHECK, OF CLEVELAND, OHIO.

WOOD-SAWING MACHINE.

987,747.  Specification of Letters Patent.  Patented Mar. 28, 1911.

Application filed July 5, 1910. Serial No. 570,230.

*To all whom it may concern:*

Be it known that I, JOHN BERNARD SCHECK, a citizen of the United States, residing at Cleveland, in the county of Cuyahoga and State of Ohio, have invented certain new and useful Improvements in Wood-Sawing Machines, of which the following is a specification.

My invention relates to a wood sawing machine, and the invention consists in the novel and original construction and combinations of parts substantially as shown and described and particularly pointed out in the claims.

Figure 1:
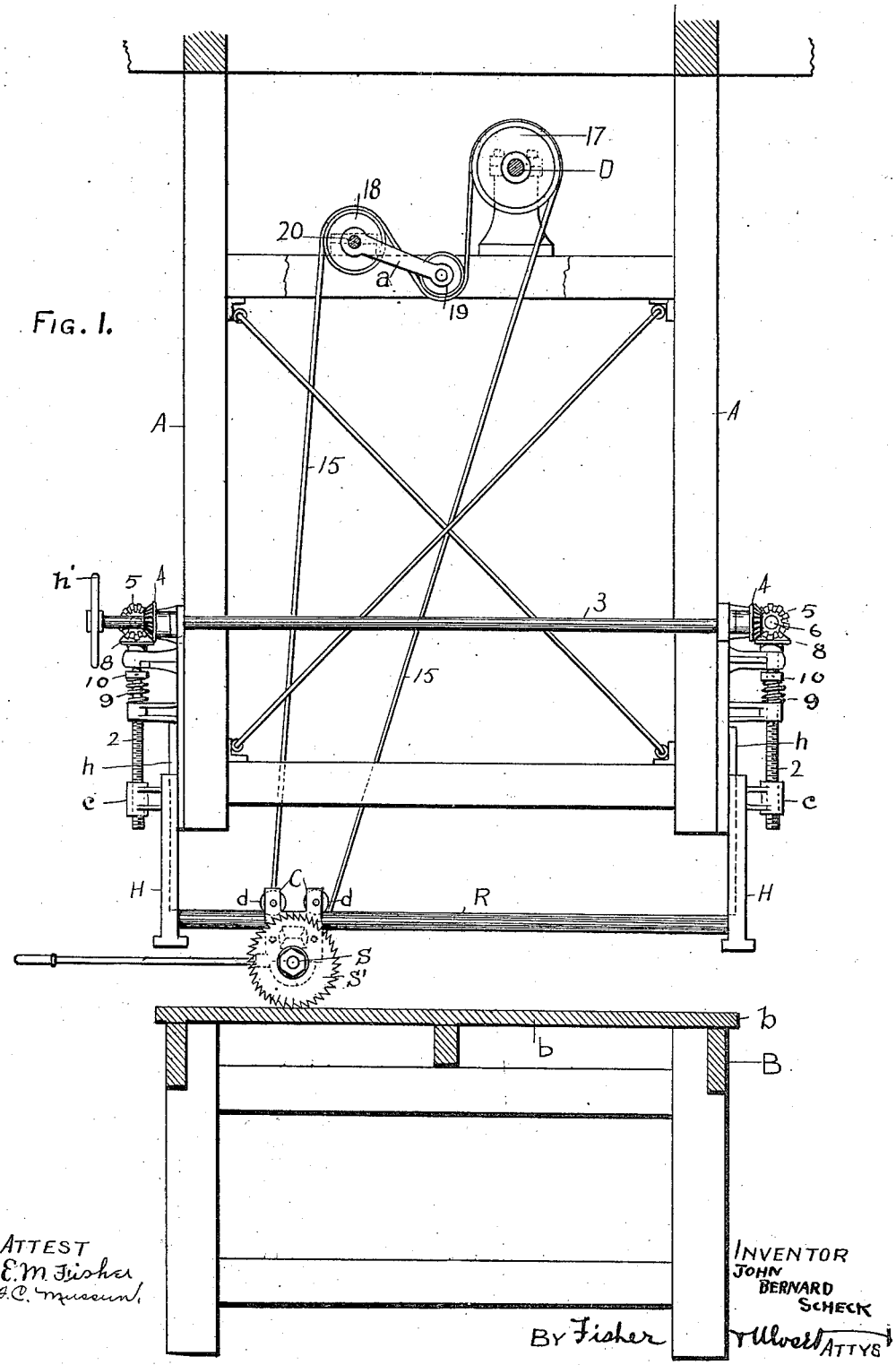
Figure 2:
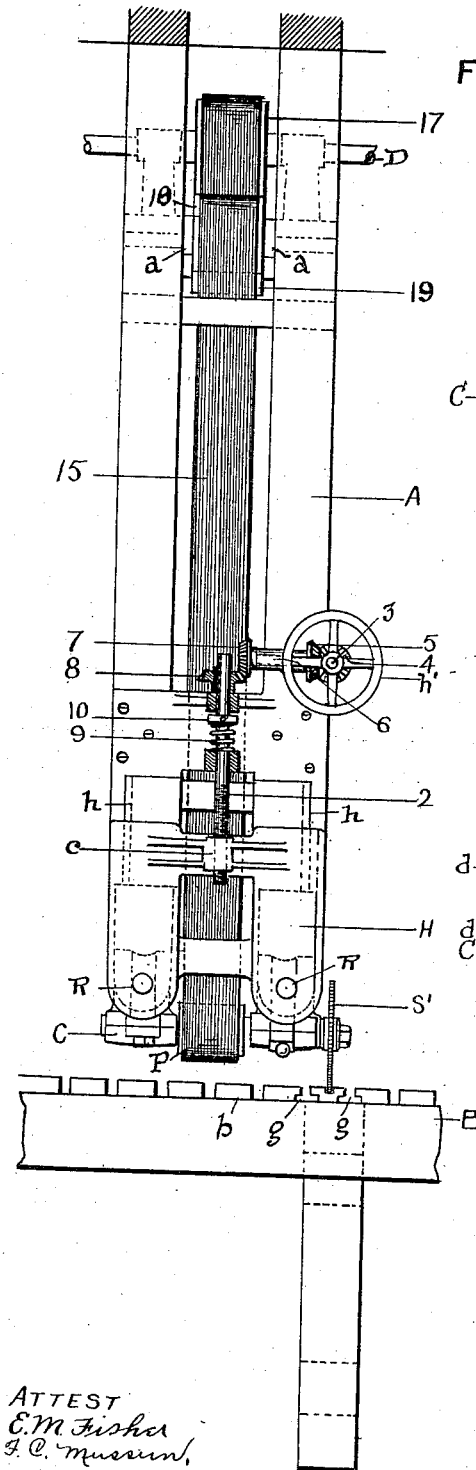
Figure 3:
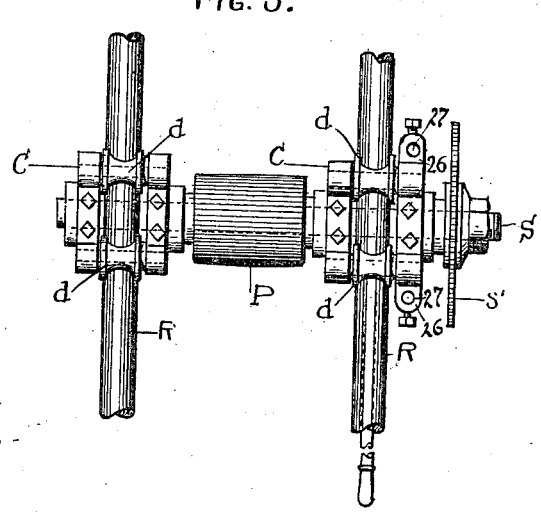
Figure 4:
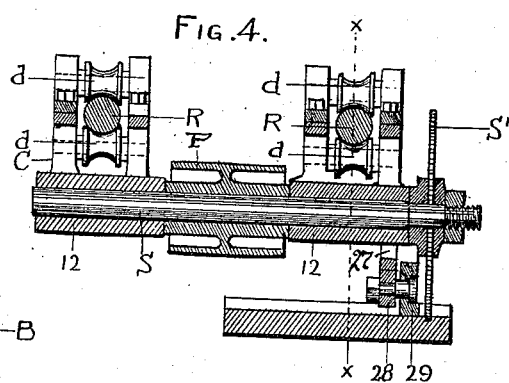
Figure 5:
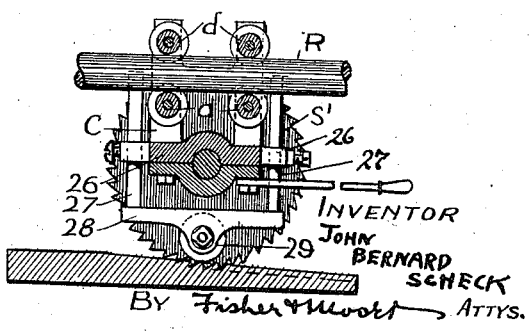

In the accompanying drawings, Figure 1 is a front elevation of the machine with the table or bed in cross section. Fig. 2 is a side elevation of the parts shown in Fig. 1. Fig. 3 is a plan view of the carriage and parts carrying the saw, and Fig. 4 is a sectional elevation of said parts on the axis of the saw carrying shaft. Fig. 5 is a cross section on line x—x, Fig. 4. Fig. 6 is a plan view of the table and the guides thereon, and Fig. 7 is a front edge view of the table.

Now, returning to the drawings, A represents the main frame of the machine, which is the part upon which the saw S' is mounted, and B the base which carries the work and referred to herein also as the work-table. The table proper on said base is purposely made with open slots or spaces between the slats or boards *b* so as to make it self cleaning at least as to sawdust and other small particles that will sift through out of the way. The said main frame A is practically a suspended frame, being hung from suitable supports from above and made perfectly rigid with its supports whatsoever their character, the idea being to bring the saw into clearance at the bottom of the said frame and provide room for its travel back and forth and in working relations with the top of the table, or the work thereon.

The saw is fixed upon the front end of shaft S, which is supported in a carriage or carrier C mounted upon two tracks, rods or bars R, which preferably are cylindrical and are supported on or in vertically suspended hangers H slidably mounted in suitable guideways *h* in or upon the frame A. The said hangers are double and have double parallel guides *h* on said frame and are vertically adjustable thereon by means of screws 2 engaged in threaded bosses *c* centrally at the top and outside of said hangers and actuated by hand controlled shaft 3 rotatably mounted on frame A and carrying bevel pinions 4 at its ends meshing with other bevel pinions 5 on the short shafts 6, Fig. 2, which in turn have bevel pinions 7 meshing with like pinions 8 on the adjusting screws 2. The latter pinions, 8, rest upon a bearing for shaft 2 on main frame A and are slidably mounted on said shaft and engaged therewith by a feather or the like so as to rotate the shaft and yet allow the shaft to slide up and down therein while the said pinion 8 holds its engagement with pinion 7. A spring 9 rests on another of the bearings of shaft 2 and engages a collar 10 thereon so as to support the said shaft and the hanger H with a measure of spring cushion for the hanger, though this is very slight. The adjusting mechanism connected with each of the said hangers H is therefore the same as to both or in duplicate, and hand wheel *h'* serves to effect all the adjustments as to elevation which the saw requires. As to this the limits of adjustments may be large or small, and different sizes of saws can be used according to the work to be done. The saw therefore is interchangeably mounted on shaft S.

Two separate but similar carriers C support shaft S from the respective parallel tracks or rails R, and in order that there shall be uniform and even travel on both tracks by the saw and that the saw shall be held evenly at work in its travel I provide duplicate rollers *d* top and bottom in each carriage bearing against the track or rod R both above and below the same, the upper rollers supporting the carriers on said rods and the lower rollers taking the bearing upward when the saw is at work. A pulley P is mounted on shaft S between said carriages to apply the power for driving the saw, and a belt 15 serves this purpose. The said belt must of course accommodate itself to the changing position of the saw or the shaft S and pulley P as they travel together over tracks R and the work table, and to this end a drive shaft D is mounted in the upper portion of main frame A and said belt passes over pulley 17 thereon and around two idlers 18 and 19. The idler 18 is supported in fixed bearings on frame A and idler 19 on arms *a* swung from shaft 20 of said idler 18 into the space between said idler and pulley 17. The belt has enough slack to permit said idler 19 to occupy a gravitating or depression relation at all times to take the slack up and keep the belt stretched whatever the positions of the saw in its back and forth travel may be.

The table, Figs. 6 and 7, is shown as having at least one gage G, although two can be advantageously used, and said gages are intended exclusively for locating the stock or work in respect to the saw. To this end the table is provided with several guide channels $g$ between or in the opposed edges of the slats $b$, and said gage members have headed screws $n$ adapted to run in said channels and to be fastened therein by set screws $m$ on top. Said gages G, preferably, are L shaped in cross section, and in addition to the straight guide channels $g$ I also have segmental or arc shaped channels 25 on the respective halves or parts of the table, each arc being struck from a slightly different center from the other end each running into one of the two transverse channels $g$ at the middle of the table. By these means I can make any angle of position desired for the stock in respect to the saw, and the saw runs between the two central channels $g$. All said transverse channels $g$ communicate with one or the other end of said arcs 25.

In some cases it is desirable to provide means to limit the depth of cut of the saw, as in undulating or uneven surfaces or where the stock has varying depths and it is desired to make the cut uniformly deep in all. To this end I provide a cut controlling device which is mounted adjacent to the saw and comprises lateral arms 26 on carriage C, rods 27 adjustably fixed by set screws in said arms and which support a cross-piece 28 at their lower ends having a roller 29 mounted therein and adapted to run on the surface of the stock next to the saw and limit the depth at which the saw can cut, which may be greater or less. The spring supported adjusting screws for hangers H and shaft S provide for this kind of work by permitting the saw to rise and drop as it travels. Any other suitable tool than a saw and which will operate by rotation may be substituted for the saw, and the saw or tool may be used to cut any desired depth in the stock or entirely through the same as the work may require.

What I claim is:

1. The main frame and hangers adjustably mounted thereon, means for simultaneously raising or lowering said hangers, tracks rigidly supported at their ends on said hangers, a carriage adapted to travel on said tracks and a saw mounted on said carriage, the said means for raising and lowering the carriage comprising screw shafts and spiral springs about said shafts adapted to accommodate the saw to uneven surfaces traversed thereby.

2. A fixed frame, a double railed track and hangers therefor adjustably mounted on the bottom of said frame, screw shafts supporting said hangers on said frame, collars on said screws and springs between said collars about said shafts providing automatic play for said shafts axially within limits, and a rotatable tool and a carriage therefor adapted to travel on said track.

In testimony whereof I affix my signature in presence of two witnesses.

JOHN BERNARD SCHECK.

Witnesses:
R. B. MOSER,
E. M. FISHER.

---

Copies of this patent may be obtained for five cents each, by addressing the "Commissioner of Patents, Washington, D. C."